United States Patent [19]

Terabayashi

[11] 4,001,661

[45] Jan. 4, 1977

[54] ONE-TOUCH ACTION TYPE POWER WINDOW

[75] Inventor: Gosaku Terabayashi, Toyota, Japan

[73] Assignee: Toyota Jidosha Kogyo Kabushiki Kaisha, Toyota, Japan

[22] Filed: June 30, 1975

[21] Appl. No.: 592,079

[30] Foreign Application Priority Data

Feb. 6, 1975 Japan .................. 50-14887

[52] U.S. Cl. .................. 318/264; 318/267; 318/474

[51] Int. Cl.² .................. H02P 3/08

[58] Field of Search .......... 318/264, 265, 267, 272, 318/275–278, 445, 446, 452, 453, 474

[56] References Cited

UNITED STATES PATENTS

| | | | |
|---|---|---|---|
| 3,199,857 | 8/1965 | Klamp .................. | 318/267 X |
| 3,914,675 | 10/1975 | Konrad .................. | 318/453 |
| 3,953,777 | 4/1976 | McKee .................. | 318/474 |

Primary Examiner—James R. Scott
Assistant Examiner—W. E. Duncanson, Jr.
Attorney, Agent, or Firm—Stevens, Davis, Miller & Mosher

[57] ABSTRACT

A one-touch action type power window having a retaining circuit which continuously actuates a motor for raising or lowering window glass in response to a one-touch operation on a switch. A pick-up coil is located in the vicinity of a wire through which the motor operating current flows to generate a voltage varying in proportion to the rotational speed of the motor thereby to control the retaining circuit.

6 Claims, 3 Drawing Figures

ONE-TOUCH ACTION TYPE POWER WINDOW

BACKGROUND OF THE INVENTION:

This invention relates to improvements in and relating to one-touch action type power windows for vehicles which have a retaining circuit for raising or lowering window glass by one-touch operation on a switch.

For the purpose of stopping a motor as soon as window glass is completely opened or closed or when a finger is caught in the window, the conventional one-touch action type power windows are usually provided with a pulse generator in the motor, to supply a signal indicative of the rotational speed of the motor to the retaining circuit thereby to control the same to stop the motor. However, the provision of the pulse generator which usually has a complicate construction requires a higher production cost and will invite various troubles during use of the power window. For these reasons, there has been a strong demand for a simple and reliable one-touch action type power window.

The present invention therefore has as its object the provision of a simple and reliable one-touch action type power window.

It is another object of the present invention to provide a one-touch action type power window which allows a greater degree of freedom in designing.

It is still another object of the invention to provide an energy-saving one-touch action type power window which can contribute to avoid unnecessary consumption of electric current.

According to the instant invention, and for the purpose of attaining the just-mentioned objects, there is provided a one-touch action type power window which comprises in combination: a change-over switch connected to a power source and having a movable contact returnable automatically to a neutral position upon removal therefrom of an operating force and UP and DOWN contacts located opposingly on opposite sides of said movable contact; a reversible motor connect to said UP and DOWN contacts to drive a window operator to raise or lower the window glass; a retaining circuit having an input terminal connected said UP and DOWN contacts and an output terminal to said motor, and adapted to hold said motor in an actuated state upon closing said change-over switch on said UP or DOWN contact and after removal of said operating force from said change-over switch; detecting means located close to a wire through which the operating current of said motor flows and adapted to generate a varying voltage in response to variations occurring in the electric field around said wire due to interruptions of said motor operating current; and a control circuit having an input terminal connected to said detecting means and an output terminal to said retaining circuit, and adapted to detect the rotational speed of said motor from said varying voltage and to actuate said retaining circuit only when said rotational speed of said motor is above a predetermined value.

In a preferred form of the invention, the detecting means is provided in the form of a pick-up coil which picks up the frequency of the interrupted current in terms of voltage variations. The pick-up coil converts the variations in the electric field surrounding the wire alternately into voltage variations according to the law of electromagnetic induction, the obtained alternative current being fed to a control circuit to produce through D-A conversion a signal voltage varying in proportion to the rotational speed of the motor. The control circuit controls the retaining circuit in response to the signal voltage to stop the motor. The pick-up coil is extremely simple in construction and involve no complicate structure as would cause troubles during use, thus permitting to fabricate a one-touch action type power window which is simple in construction and reliable in operation as compared with conventional counterparts which have a pulse generator within the motor. The pick-up coil may be located in any position as long as it is suitably associated with the operating current of the motor and thus allows a greater degree of freedom in designing. Furthermore, the pick-up coil contributes to save the battery power as it utilizes the motor operating current.

The above and other objects, features and advantages of the invention will become apparent from the following description and appended claims taken in conjunction with the accompanying drawings which show by way of example a preferred embodiment of the invention.

Figure 1:
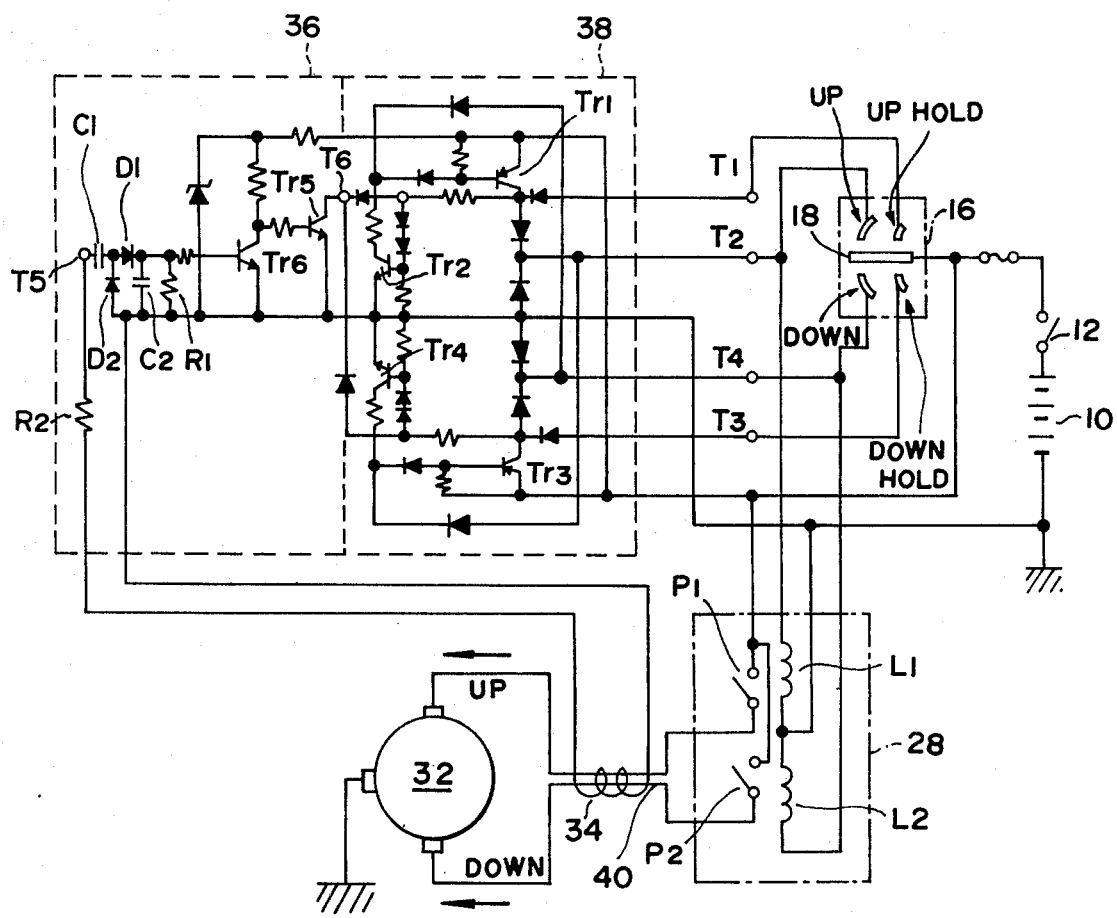
FIG. 1 is a circuit diagram of the one-touch action type power window according to the present invention.

PARTICULAR DESCRIPTION OF THE INVENTION:

Referring to the circuit diagram of FIG. 1, when an ignition switch 12 is in its closed position and when a power window switch or a change-over switch 16 is pushed ON or into the UP position, current flows from a battery 10 to the ground through an UP contact and a coil $L_1$ of the power relay 28, closing the point $P_1$ of the power relay 28 to rotate the motor 32 in the UP direction. On the contrary, when the change-over switch is pushed to the DOWN position, the coil $L_2$ of the power relay 28 is energized to close the point $P_2$ of the power relay 28, rotating the motor 32 in the DOWN direction which is reverse to the UP direction.

If the power window switch 16 is pushed further to the UP HOLD position, the battery voltage is applied to the UP input terminal $T_1$ of the retaining circuit 38 and the current flows through the base circuit of the transistor $Tr_2$ to render the same conductive. As the transistor $Tr_2$ becomes conductive, the current flows through the base circuit of the transistor $Tr_1$. By the conduction of the transistor $Tr_1$, the current flows through the UP output terminal $T_2$ of the retaining circuit 38 to the coil $L_1$ of the power relay 28, closing the point $P_1$ of the power relay 28 to rotate the motor 32 in the UP direction. After the operating force is removed from the power window switch 16, allowing the movable contact 18 to return automatically to the neutral position to disconnect the battery power source, the transistor $Tr_2$ is held conductive since the current flows through the transistor $Tr_1$ and through the base circuit of the transistor $Tr_2$. As a result, even after the removal of the operating force from the power window switch 16, the motor 32 is held continuously in the actuated state.

As the operating current flows through the motor 32, the pick-up coil 34 which is located close to the wire 40 detects ON-OFF signals which are proportional to the rotational speed of the motor, for supply to the input terminal $T_5$ of the control circuit 36. The control circuit 36 has at its input terminal a D-A conversion circuit which comprises capacitors $C_1$ and $C_2$, a diode $D_1$ and a resistor $R_1$ and which is adapted to produce at the terminals of the capacitor $C_2$ a DC voltage varying in proportion to the rotational speed of the motor 32. If the speed of the motor is increased and the terminal voltage of the capacitor $C_2$ exceeds a predetermined value, the current flows through the base circuit of the transistor $Tr_6$, rendering the transistor $Tr_6$ conductive and the transistor $Tr_5$ non-conductive. As a result, the transistors $Tr_1$ and $Tr_2$ become conductive to supply the operating current continuously to the motor 32.

In the case of DOWN HOLD, the control circuit operates in a similar manner except that the transistors $Tr_3$ and $Tr_4$ play the roles of the transistors $Tr_1$ and $Tr_2$, respectively, and the input terminals $T_3$ and $T_4$ play the roles of the terminals $T_1$ and $T_2$, respectively.

If, during rotation of the motor, the window glass opening or closing operation is completed or a vehicle occupant's finger is caught by the window glass to impose an overload on the motor, the rotational speed of the motor is reduced and the detected signal drops below the predetermined value. As a result, the terminal voltage of the capacitor $C_2$ is lowered and no current flows through the base circuit of the transistor $Tr_6$. The transistor $Tr_6$ thus becomes non-conductive while the transistor $Tr_5$ becomes conductive to render the transistor $Tr_2$ non-conductive. This makes the transistor $Tr_1$ also non-conductive. Consequently, the current to the output terminal $T_2$ of the retaining circuit 38 is blocked to stop the motor 32. When the motor 32 is in operation in the mode of UP HOLD, if the changeover switch 16 is manipulated to the opposite position of DOWN, the motor 32 is caused to stop since the currents of the directions UP and DOWN are both applied thereto. Once the motor 32 is stopped, the afore-mentioned mode of operation UP HOLD is cancelled to terminate the one-touch operation.

Figure 2A:
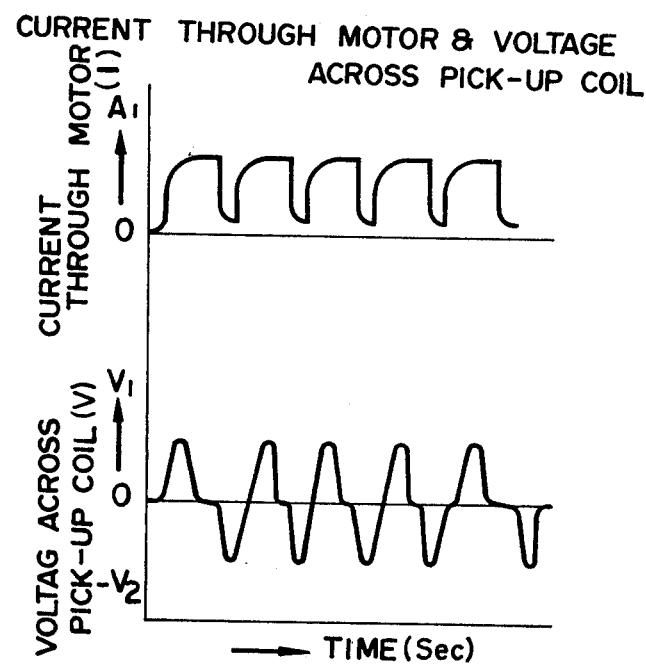
FIG. 2a is a graphic illustration showing a motor conduction pattern in relation with terminal voltage of a pick-up coil.
Figure 2B:
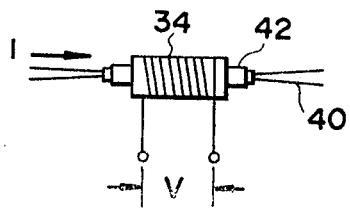
FIG. 2b is a diagrammatic view of the pick-up coil.

Referring to FIGS. 2a and 2b, the pick-up coil 34 detects the rotational speed of the motor 32 in the following manner. In this connection, FIG. 2a is a graphical illustration showing the conduction pattern of the motor 32 in relation with the terminal voltage of the pick-up coil 34, while FIG. 2b is a diagrammatic view of the pick-up coil 34 with the operating current I of FIG. 2a and the terminal voltage V of the pick-up coil 34 shown in the respective positions. The operating current I flowing through the motor 32 is repeatedly interrupted by the brush action of the motor 32 to have a waveform as shown diagrammatically in FIG. 2a. The terminal voltage V of the pick-up coil 34 is induced to have a positive voltage $V_1$ at the point where the motor current I is increased. On the other hand, when the motor current I is reduced, the terminal voltage V of the pick-up coil 34 is induced to have a negative voltage $V_2$ of the waveform as shown diagrammatically in FIG. 2a. In the D-A converter of the control circuit 36 which is supplied with the induced voltage V, both of the capacitors $C_1$ and $C_2$ are charged simultaneously where the terminal voltage of the pick-up coil has the positive value $V_1$. In this instance, however, the capacitor $C_2$ is not charged sufficiently as compared with the capacitor $C_1$ which has a smaller capacity. At the negative voltage $V_2$, the capacitor $C_1$ is charged in the reverse direction through the diode $D_2$ and the charge of the capacitor $C_2$ is discharged through the resistor $R_1$.

While the rotational speed of the motor 32 is relatively low, the capacitor $C_2$ is repeatedly charged but not fully charged. However, as the speed of the motor 32 increases, the charge of the capacitor $C_2$ at last reaches a level sufficient to make the transistor $Tr_6$ conductive. In this instance, it is preferred to connect a buffering resistor $R_2$ between the pick-up coil 34 and the capacitor $C_1$.

The pick-up coil 34 may be fabricated by a known method in the form as shown in FIG. 2b. The wire 40 connecting the motor 32 to the points $P_1$ and $P_2$ of the power relay 28 is preferred to be held in a fixed position relative to the pick-up coil 34 by means of a wire support 42. The pick-up coil 34 may be located in any position where the motor current I flows closely but is preferred to be located in a position between the motor 32 and the contact points $P_1$ and $P_2$ of the relay, more particularly, within the relay or within the length of the wire 40 or within the motor 32, depending upon the particular restrictions or conditions which are imposed in connection with designing.

While the above-described embodiment represents the preferred form of the invention, it is to be understood that modifications and alterations will occur to those skilled in the art without departing from the spirit of the invention as defined in the appended claims. The scope of the invention should therefore be determined solely by the appended claims.

What is claimed is:

1. A one-touch action type power window, comprising in combination:
   a. A change-over switch connected to a power source and having a movable contact returnable automatically to a neutral position upon removal therefrom of an operating force and UP HOLD and DOWN HOLD contacts located opposingly on opposite sides of said movable contact;
   b. a reversible motor connected to said UP and DOWN contacts to drive a window operator to raise or lower the window glass;
   c. a retaining circuit having an input terminal connected to said UP HOLD and DOWN HOLD contacts and an output terminal to said motor and adapted to hold said motor in an actuated state upon closing said change-over switch on said UP contact or DOWN contact and after said change-over switch is opened by removal therefrom of an operating force;
   d. detecting means located close to a wire through which the operating current of said motor flows and adapted to generate a voltage varying in response to variations occurring in the magnetic field around said wire due to interruptions of said operating current; and
   e. a control circuit having an input terminal connected to said detecting means and an output terminal to said retaining circuit and adapted to detect the rotational speed of said motor from said voltage variations and to actuate said retaining circuit only when said rotational speed of said motor is above a predetermined value.

2. A one-touch action type power window as set forth in claim 1, wherein said detecting means is in the form of a pick-up coil.

3. A one-touch action type power window as set forth in claim 2, wherein said pick-up coil is held in a fixed position relative to said wire by means of a wire support.

4. A one-touch action type power window as set forth in claim 3, wherein said pick-up coil surrounds said wire.

5. A one-touch action type power window as set forth in claim 1, wherein said control circuit including a D-A conversion circuit producing a direct current voltage corresponding to the frequencies of the output voltage from said detecting means and a solid state circuit in the Schmidt trigger configuration.

6. A one-touch action type power window as set forth in claim 1, wherein said change-over switch further having UP and DOWN contacts located on opposite sides of said movable contact having two operation positions, said movable contact coming in contact with only UP or DOWN contact at the first operation position and UP or DOWN contact and UP HOLD or DOWN HOLD contact, respectively, at the second operation position, and when said movable contact is at the first operation position, said reversible motor is energized only during the application of operating force on said movable contact.

* * * * *